United States Patent [19]

Matsui et al.

[11] Patent Number: 4,627,671

[45] Date of Patent: Dec. 9, 1986

[54] ANTISKID CONTROL DEVICE

[75] Inventors: Kazuma Matsui, Toyohashi; Yoshiyuki Hattori, Toyoake; Yuichi Imani, Hamamatsu; Akira Kuno, Oobu; Yoshihisa Nomura, Toyota, all of Japan

[73] Assignees: Nippondenso Co., Ltd., Kariya; Toyota Jodosha Kabushiki Kaisha, Toyota, both of Japan

[21] Appl. No.: 792,007

[22] Filed: Oct. 28, 1985

[30] Foreign Application Priority Data

Nov. 1, 1984 [JP] Japan .................. 59-228889
Feb. 6, 1985 [JP] Japan .................. 60-19837
Mar. 15, 1985 [JP] Japan .................. 60-53042
Jul. 2, 1985 [JP] Japan .................. 60-143856

[51] Int. Cl.⁴ .............................................. B60T 8/04
[52] U.S. Cl. ................................. 303/116; 303/111
[58] Field of Search ............. 188/181 A; 303/10, 61, 303/110, 111, 114, 116, 119

[56] References Cited

U.S. PATENT DOCUMENTS 4,395,073  7/1983  Arikawa et al. .................. 303/116

FOREIGN PATENT DOCUMENTS 49-28307  7/1974  Japan .
49-32494  8/1974  Japan .

Primary Examiner—Duane A. Reger
Attorney, Agent, or Firm—Cushman, Darby & Cushman

[57] ABSTRACT

An antiskid control device including a main line system for usual braking operation, a subline system for an antiskid control, and an oil hydraulic mechanism supplying pressurized oil to the subline system. The oil hydraulic mechanism has an oil hydraulic source constantly generating hydraulic pressure during operation of the engine of the vehicle, an oil hydraulic motor driven by the oil hydraulic source, and an oil hydraulic pump discharging a highly pressurized oil. While the oil hydraulic motor is constantly rotated during the operation of the engine, the oil hydraulic pump is rotated when the rotation of the oil hydraulic motor is transmitted thereto. For this purpose, a mechanism for transmitting the rotation between the motor and the pump is provided.

9 Claims, 13 Drawing Figures

ANTISKID CONTROL DEVICE

BACKGROUND OF THE INVENTION

1. Field of the Invention

The present invention relates to a brake system of a vehicle. More particularly, it relates to an antiskid control device to prevent wheels of the vehicle from locking when the brake system is operated, so that drivability of the vehicle is maintained.

2. Description of the Related Art

In a brake system of a vehicle, a master cylinder connected to a brake pedal and a wheel cylinder provided in a brake mechanism of the wheel are connected to each other by a piping system. An antiskid control device as disclosed, for example, in Japanese Examined Patent Publications No. 49-28307 and 49-32494, has a construction in which, in the piping system, a valve for discharging a pressurized oil in the wheel cylinder and a pump for supplying a pressurized oil to the wheel cylinder are provided. Thus, when a locking condition of the wheel is sensed, the pressure in the oil in the wheel cylinder is quickly released. Subsequently, if the wheel returns to a braking condition, the pump supplies oil at a gradually increased pressure to the wheel cylinder.

During antiskid control, an oil pressure at least higher than the pressure held in a nonbraking condition must be maintained and a certain amount of oil must be supplied to the wheel cylinders. In a conventional antiskid control device, the pump is usually driven by an electric motor, therefore the size of the unit must be increased to ensure that a pressure and flow rate higher than a constant value can be maintained during antiskid control.

SUMMARY OF THE INVENTION

Therefore, an object of the present invention is to provide an antiskid control device in which the size of the pump is reduced and a sufficient amount of pressurized oil is supplied to the wheel cylinders of a vehicle braking system.

According to the present invention, there is provided an antiskid control device comprising a main line system, a switching means, an oil hydraulic mechanism, a subline system, and a controlling means. The main line system has a first hydraulic source, a main line connecting the first hydraulic source to the wheel cylinders, and a cut-off valve provided in the main line to open and close the main line. The switching means switches the cut-off valve to normally open the main line, and to close the main line when a locking condition occurs in a wheel or wheels of the vehicle. The oil hydraulic mechanism has an oil hydraulic source constantly generating hydraulic pressure when the engine is driven, an oil hydraulic motor rotating when the hydraulic pressure is transmitted from the oil hydraulic source, an oil hydraulic pump discharging a pressurized oil, a means for connecting the oil hydraulic motor to the oil hydraulic pump to drive the pump, and a means for transmitting the hydraulic pressure of the oil hydraulic source to the oil hydraulic motor when the locking condition occurs in a wheel or wheels of the vehicle. The subline system has a subline connecting the hydraulic pump to the wheel cylinder, a switching valve provided in the subline to open and close the subline, and a means for releasing a pressurized oil in the wheel cylinder to the outside thereof when the switching valve is closed. The controlling means controls the switching valve to open or close the subline when the locking condition occurs in a wheel or wheels of the vehicle.

BRIEF DESCRIPTION OF THE DRAWINGS

The present invention may be more fully understood from the description of the preferred embodiments of the invention set forth below, together with the accompanying drawings, in which.

DESCRIPTION OF THE PREFERRED EMBODIMENTS

The present invention will now be described with reference to the following preferred embodiments.

Figure 1:
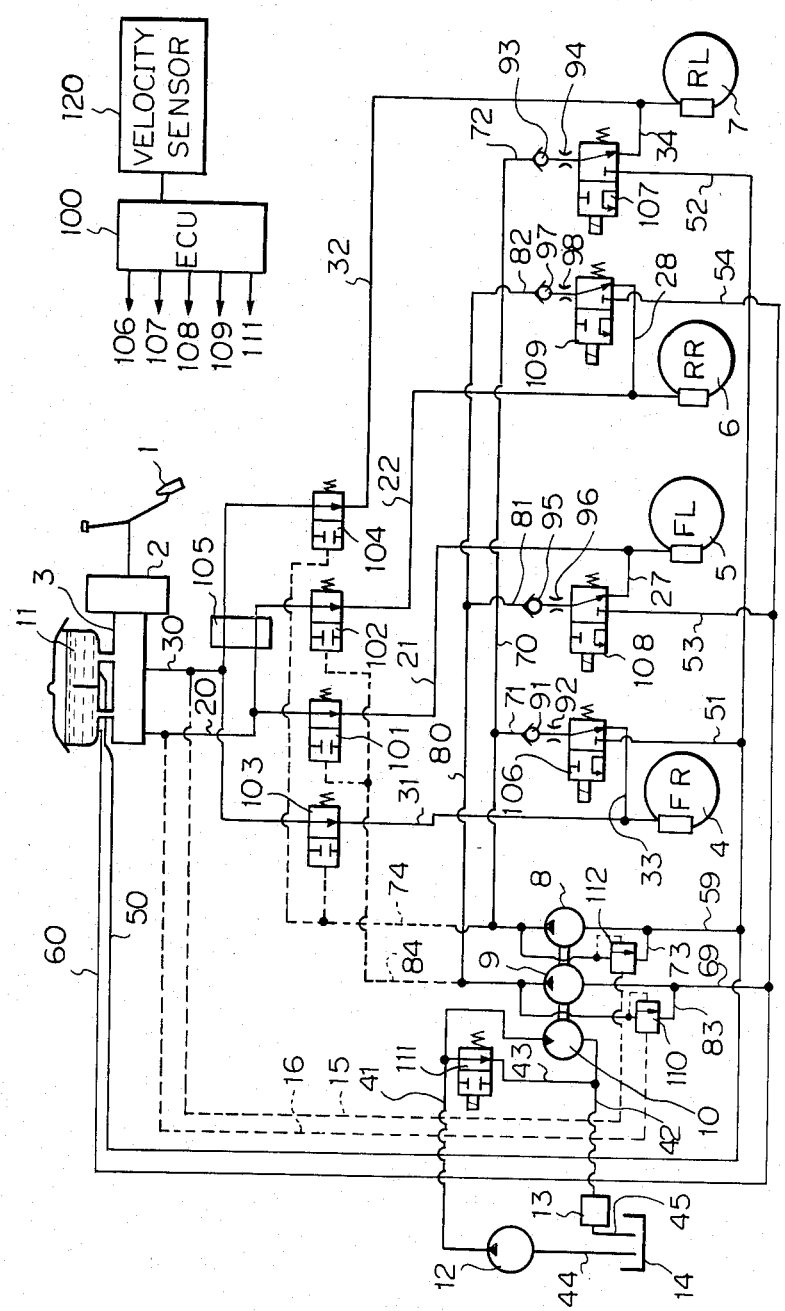
FIG. 1 is a hydraulic circuit of a first embodiment of the present invention.

FIG. 1 shows a first embodiment of the present invention. This embodiment is an example in which the present invention is applied to a so-called FF (front-engine-front-drive) type vehicle provided with a brake system having a well-known X-type piping system. That is, the brake system is constructed in such a manner that a wheel cylinder 4 of the front right (FR) wheel and a wheel cylinder 5 of the rear left (RL) wheel are supplied with brake oil through the same piping system, and a wheel cylinder 6 of the front left (FL) wheel and a wheel cylinder 7 of the rear right (RR) wheel are supplied with brake oil through the same piping system. A brake pedal 1 is connected to a master cylinder 3 through a brake booster 2, so that an oil pressure generated by operation of the brake pedal 1 is transmitted to the wheel cylinders 4, 5, 6, and 7 of the front right (FR), front left (FL), rear right (RR), and rear left (RL) wheels, respectively, to carry out a braking operation. The brake booster 2 is, as previously known, operated by a negative pressure occurring in an intake manifold of the engine, and this pressure is exerted on a push rod connected to a piston of the master cylinder 3 in response to an operation of the brake pedal 1, to reduce the force needed by the driver when operating the brake pedal 1.

The master cylinder is provided with two pressure chambers (not shown) from which brake oil is discharged at the same pressure. The chambers are connected to main lines 20 and 30, respectively. The main line 20 diverges to branch lines 21 and 22; the branch line 21 being connected to the wheel cylinder 5 of the front left (FL) wheel, and the branch line 22 being connected to the wheel cylinder 6 of the rear right (RR) wheel. Cut-off valves 101 and 102, which are two-port-two-position valves, are provided in the branch lines 21 and 22, respectively. The cut-off valve 101 opens the branch line 21 at the first valve position (the normal valve position) shown in the drawing, and closes the branch line 21 at the second valve position (the offset valve position) not shown in the drawing. The cut-off valve 102 opens and closes the branch line 22 in the same way as the cut-off valve 101. The main line 30 diverges to branch lines 31 and 32; the branch line 31 being connected to the wheel cylinder 4 of the front right (FR) wheel, and the branch line 32 being connected to the wheel cylinder 7 of the rear left (RL) wheel. Cut-off valves 103 and 104, which are two-port-two-position valves, are provided in the branch lines 31 and 32, respectively. These cut-off valves 103 and 104 open and close the branch lines 31 and 32, respectively, in the same way as the cut-off valves 101 and 102. Each cut-off valve 101, 102, 103, and 104 is switched from the first valve position to the second valve position by a pressurized oil discharged from oil hydraulic pumps 8 and 9, as described later.

A previously known proportioning valve 105 is provided in the branch lines 22 and 32 connected to the wheel cylinders 6 and 7 of the left (RL) and right (RR) rear wheels, respectively, so that brake oil having a pressure lower than the discharge pressure of the master cylinder 3 is supplied to the wheel cylinders 6 and 7 of the left (RL) and right (RR) rear wheels when the oil pressure in the branch lines 22 and 32 is more than a predetermined constant value.

A usual brake operation is carried out by the construction described above. In this state, the cut-off valves 101, 102, 103, and 104 are positioned in the first valve position, respectively. Oil pressure generated in the master cylinder 3 by operation of the brake pedal 1 is transmitted to the wheel cylinder 5 of the front left (FL) wheel through the main line 20 and the branch line 21, to the wheel cylinder 6 of the rear right (RR) wheel through the main line 20 and the branch line 22, to the wheel cylinder 4 of the front right (FR) wheel through the main line 30 and the branch line 31, and to the wheel cylinder 7 of the rear left (RL) wheel through the main line 30 and the branch line 32, respectively.

The construction of the system for carrying out an antiskid operation is described below.

The hydraulic pumps 8 and 9 are driven by a hydraulic motor 10, as described later, to such brake oil through branch lines 59 and 69 connected to return lines 50 and 60, respectively, which return lines 50 and 60 communicate with a reservoir 11 mounted on the master cylinder 3, and to supply the brake oil to the wheel cylinders 4, 5, 6, and 7 through sublines 70 and 80.

A branch line 71 of the subline 70 can communicate with a subbranch line 33 of the branch line 31 through a switching valve 106. The branch line 71 has a check valve 91 for preventing brake oil from flowing upstream of the switching valve 106 and an orifice 92 for restricting the flow rate therethrough. The switching valve 106 is a three-port-two-position valve; one outlet port being connected to the subbranch line 33, and the other outlet port being connected to a branch line 51 of the return line 50. Thus, the switching valve 106 allows the branch line 71 to communicate with the subbranch line 33 at the first valve position (the normal valve position) shown in the drawing, and the subbranch line 33 to communicate with the branch line 51 at the second valve position (the offset valve position) not shown in the drawing. Therefore, when the switching valve 106 is positioned at the first valve position, brake oil discharged from the pump 8 is supplied to the wheel cylinder 4 of the front right (FR) wheel through the subline 70, the branch line 71 and the subbranch line 33. Conversely, when the switching valve 106 is positioned at the second valve position, brake oil in the wheel cylinder 4 is released to the reservoir 11 through the subbranch line 33, the branch line 51, and the return line 50.

A branch line 72 of the subline 70 can communicate with a subbranch line 34 of the branch line 32 through a switching valve 107. A check valve 93 and an orifice 94 are provided in the branch line 72. The switching valve 107 is a three-port-two position valve; one outlet port being connected to the subbranch line 34, and the other outlet port being connected to a branch line 52 of the return line 50. Thus, the switching valve 107 allows the branch line 72 to communicate with the subbranch line 34 to lead brake oil discharged from the pump 8 to the wheel cylinder 7 of the rear left (RL) wheel when the switching valve 107 is positioned at the first valve position shown in the drawing. Conversely, the switching valve 107 allows the subbranch line 34 to communicate with the branch line 52 to release brake oil in the wheel cylinder 7 of the rear left (RL) wheel to the reservoir 11 when the switching valve 107 is positioned at the second valve position not shown in the drawing.

A branch line 81 of the subline 80 can communicate with a subbranch line 27 of the branch line 21 through a switching valve 108. A check valve 95 and an orifice 96 are provided in the branch line 81. The switching valve 108 is a three-port-two-position valve; one outlet port being connected to the subbranch line 27, and the other outlet port being connected to a branch line 53 of the return line 50. Thus, the switching valve 108 allows the branch line 81 to communicate with the subbranch line 27 to lead brake oil discharged from the pump 9 to the wheel cylinder 5 of the front left (FL) wheel when the switching valve 108 is positioned at the first valve position shown in the drawing. Conversely, the switching valve 108 allows the subbranch line 27 to communicate with the branch line 53 to release brake oil in the wheel cylinder 5 of the front left (FL) wheel to the reservoir 11 when the switching valve 108 is positioned at the second valve position not shown in the drawing.

The same construction as described above is provided in a branch line 82 of the subline 80. That is, the branch line 82 is provided with a check valve 97 and an orifice 98, and is connected to a subbranch line 28 and a branch line 54 through a switching valve 109. The switching valve 109 leads brake oil to the wheel cylinder 6 of the rear right (RR) wheel when positioned at the first valve position, and releases brake oil in the wheel cylinder 6 of the rear right (RR) wheel to the reservoir 11 when positioned at the second valve position. The switching valves 106, 107, 108, and 109 are solenoid controlled valves.

The oil hydraulic pumps 8 and 9 discharge the same quantity of pressurized oil, and are coaxially rotated by the oil hydraulic motor 10 connected to the pumps 8 and 9 through a coaxial shaft and universal coupling. The oil hydraulic motor 10 is driven by a supply of pressurized oil from an oil supply pump 12 provided in a power steering system of the vehicle. An outlet port of the oil supply pump 12 is connected to an inlet port of the motor 10 through an input line 41, and an outlet port of the motor 10 is connected to a gear box 13 of the power steering system through an output line 42. Therefore, pressurized oil discharged from the outlet port of the oil supply pump 12 flows into the motor 10 through the inlet port thereof to drive the motor 10, and flows to the gear box 13 through the outlet port of the motor 10. A bypass line 43 connects the input line 41 and the output line 42, that is, the inlet and outlet ports of the motor 10 are bypassed by the bypass line 43. A control valve 111 provided in the bypass line 43 opens and closes the line 43. The control valve 111 is solenoid controlled to open the bypass line 43 at the first valve position shown in the drawing when an antiskid control is not carried out, and to shut the bypass line 43 at the second valve position not shown in the drawing when an antiskid control is carried out, so that a pressurized oil is supplied to the motor 10 to cause the motor 10 to rotate.

The pump 12 draws-in oil in the reservoir 14 through a suction line 44, and when the control valve 111 is at the first valve position, supplies pressurized oil to the gear box 13 through the input line 41, bypass line 43, and the output line 42. Therefore, in this state, since a differential in pressure does not occur in the motor 10, the motor 10 is not rotated. Conversely, when the control valve 111 is at the second valve position, the pump 12 supplies pressurized oil to the motor 10 through the input line 41 to drive the motor 10, and supplies the oil to the gear box 13 through the output line 42. The pump 12 is constantly driven when the engine of the vehicle is driven. Just after the control valve 111 is switched from the first valve position to the second valve position, pressurized oil discharged from the pump 12 is immediately supplied to rotate the motor 10 and thus rotate the pumps 8 and 9. Oil used in the gear box 13 is returned to the reservoir 14 through an exhaust line 45.

The oil hydraulic pump 8 has an inlet port and an outlet port to accommodate the flow of pressurized oil therethrough. The inlet and outlet ports are bypassed by a relief line 73 provided with a relief valve 112. Pressure in the main line 30 is conducted through a lead line 15 to the relief valve 112 to open the relief line 73 in response to the pressure in the main line 30 so that the pressure of the oil discharged from the oil hydraulic pump 8 is kept lower than the pressure in the main line 30. Similarly, the oil hydraulic pump 9 has inlet and outlet ports which are bypassed by relief line 83 having a relief valve 110. The relief valve 110 is subjected to a pressure in the main line 20 through a lead line 16, to open the relief line 83 in response to the pressure in the main line 20 so that the pressure of the oil discharged from the pump 9 is kept lower than the pressure in the main line 20.

The pressure of the oil discharged from the pump 8 acts on the cut-off valves 103 and 104 through a lead line 74 connected to the subline 70, and the pressure of the oil discharged from the pump 9 acts on the cut-off valves 101 and 102 through a lead line 84 connected to the subline 80. The cut-off valves 101, 102, 103, and 104 are spool type valves, which are switched from the first valve position to the second valve position against a spring force to close the branch lines of the main lines when oil pressure conducted from the pumps 8 and 9 becomes higher than a predetermined constant value, and are returned to the first valve position from the second valve position by the spring force when the oil pressure becomes lower than the predetermined constant value.

An antiskid control is carried out when any one of the wheels is judged to be locked, in other words, when deceleration or the slip ratio of the wheel is judged to be excessive. The deceleration and slip ratio of the wheel is calculated by an electronic control unit (ECU) 100 provided with a microcomputer. For this purpose, a velocity sensor 120 is mounted near to each wheel. The ECU 100 switches the control valve 111 from the first valve position to the second valve position when the ECU 100 decides to initiate an antiskid control. The ECU 100 then switches the switching valves 106, 107, 108, and 109 according to the amount of deceleration and slip ratio of a wheel. Note that the switching valves 107 and 109 for the rear wheels are switched to the same valve position.

Operation of the above embodiment is described below with reference to FIG. 2.

In a non-operative condition, i.e., in which a brake operation is not carried out, the cut-off valves 101, 102, 103, and 104 are positioned at the first valve position, respectively. Therefore, if force is exerted on the brake pedal 1, pressurized oil discharged from the master cylinder 3 is fed to the wheel cylinders 4, 5, 6, and 7 through the branch lines 31, 21, 22, and 32, respectively, so that pressure in these wheel cylinders is immediately increased. In the drawing, if force is exerted on the brake pedal 1 at the time $T_0$, the pressure in the wheel cylinder quickly rises so that the velocity $V_w$ of the wheel immediately drops. The velocity $V_v$ of the vehicle body begins to drop from the time $T_1$, but the velocity $V_w$ drops more quickly than the velocity $V_v$.

Figure 2:
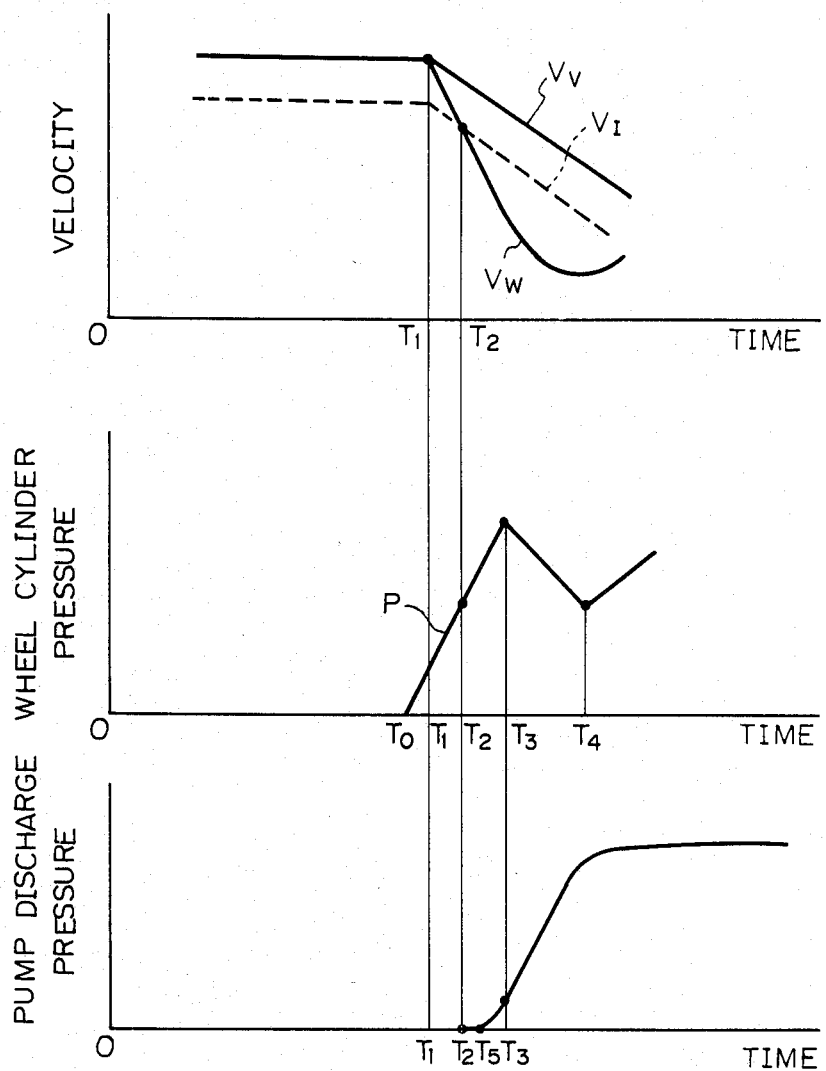
FIG. 2 is a diagram showing variation of a vehicle velocity, a wheel velocity, a wheel cylinder pressure, and a pump discharging pressure.

Then, if the velocity $V_w$ of the wheel becomes lower than a standard velocity $V_l$, which is lower than the velocity $V_v$ by a predetermined value as shown in FIG. 2, the ECU 100 judges that the slip ratio of the wheel is increasing, and outputs an antiskid control command signal. That is, at the time $T_2$, a solenoid of the control valve 111 is energized so that the control valve 111 is switched to the second valve position. As a result, pressurized oil discharged from the pump 12 is supplied to the oil hydraulic motor 10 and the pumps 8 and 9 are started. Thus, the pumps 8 and 9 discharge pressurized oil, which is fed to the cut-off valves 101, 102, 103, and 104 through the lead lines 74 and 84, so that the cut-off valves 101, 102, 103, and 104 are switched to the second valve position to shut the branch lines 21, 22, 31, and 32 at the time $T_3$.

Just after the switching operations of the cut-off valves 101, 102, 103, and 104 are finished at the time $T_3$, to reduce the pressure in the wheel cylinder of the locking wheel, the switching valve among the switching valves 106, 107, 108 and 109 corresponding to the wheel cylinder of the locking wheel is switched to the second valve position. As a result, brake oil in that wheel cylinder is released to the reservoir 11 through the return line 50. Therefore, the pressure in that wheel cylinder begins to drop from the time $T_3$. On the other hand, if deceleration of the wheel is reduced so that the pressure in the wheel cylinder must be again increased, at the time $T_4$, the corresponding switching valve is switched to the first valve position. As a result, brake oil is gradually supplied to that wheel cylinder through the corresponding branch line 71, 72, 81, or 82, which line has a large flow resistance, so that the pressure in that wheel cylinder increases at a relatively slow rate.

After that, the switching valves 106, 107, 108, and 109 are switched according to the deceleration or slip ratio of the wheels, so that the pressure in the wheel cylinders 4, 5, 6, and 7 is quickly reduced or slowly increased. The antiskid control is halted by stopping the vehicle or by turning off a brake switch provided on the brake pedal 1. At this time, the control valve 111 is switched to the first valve position to stop the supply of pressurized oil to the oil hydraulic motor 10. As a result, the pumps 8 and 9 stop operation, and therefore, pressure in the lead lines 74 and 84 drops so that the cut-off valves 101, 102, 103, and 104 are returned to the first valve position by the force of the corresponding springs.

In the antiskid control described above, the oil hydraulic pumps 8 and 9 start to rotate at the time $T_5$ after the control valve 111 is switched to the second valve position at the time $T_2$, and the discharge pressure of the pumps 8 and 9 then increases. This discharge pressure reaches a value sufficient for switching the cut-off valves 101, 102, 103, and 104 at the time $T_3$. Accordingly, the time $T_3$ when pressure in the wheel cylinders begins to decrease is advanced in comparison with the conventional system. As the oil hydraulic motor 10 driving the pumps 8 and 9 is supplied with pressurized oil by the oil supply pump 12 in the power steering system, the pumps 8 and 9 can be constantly driven while the engine of the vehicle is driven. Thus, since the pumps 8 and 9 are driven by the oil hydraulic motor 10 driven by the oil supply pump 12, the pumps 8 and 9 can be small in size compared to a previously known pump construction driven by an electric motor.

Note that the cut-off valves 101, 102, 103, and 104 may be solenoid valves.

Figure 3:
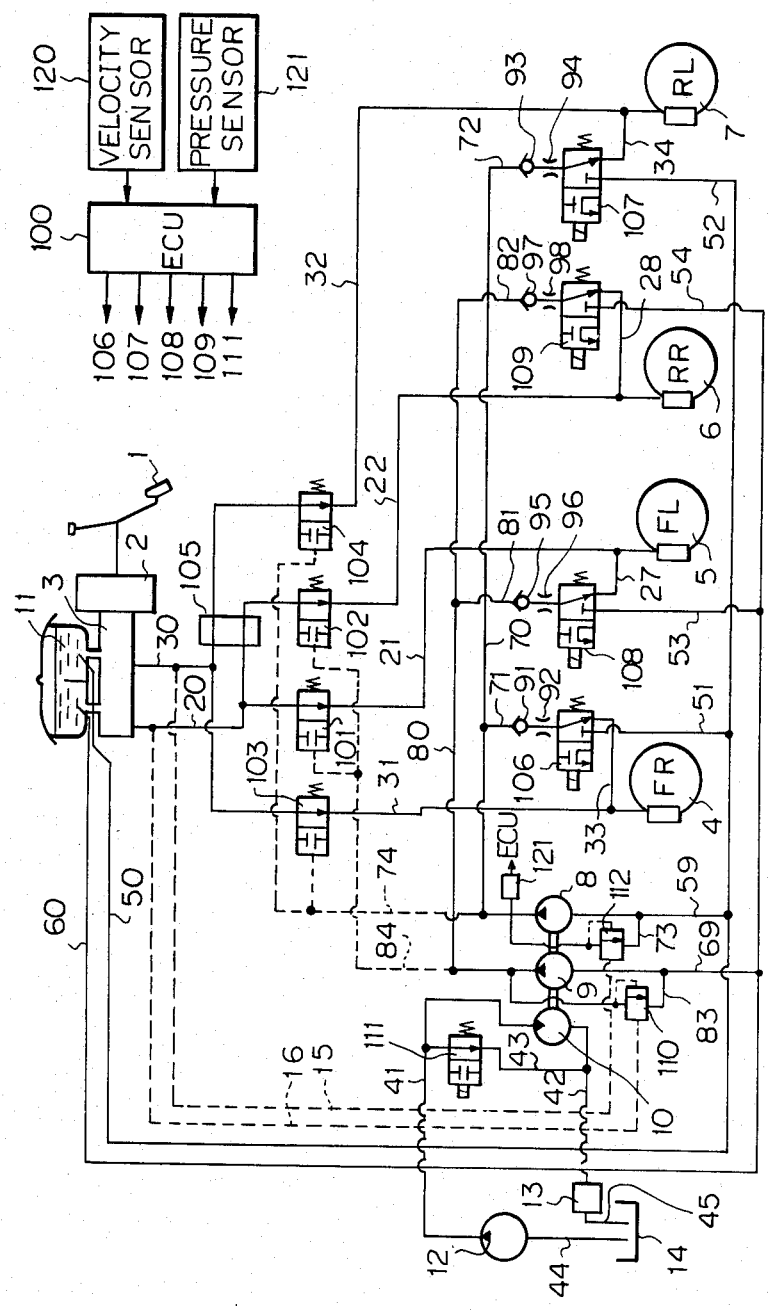
FIG. 3 is a hydraulic circuit of a second embodiment of the present invention.

FIG. 3 shows a second embodiment of the present invention. In this embodiment, a pressure sensor 121 is provided near the outlet port of the oil hydraulic pump 8. The pressure sensor 121 senses a pressure in the outlet port, and sends the sensed signal to the ECU 100. As described later, if the signal denoting that the pressure is below a predetermined value is input to the ECU 100, the ECU 100 controls the control valve 111 to stop the pumps 8 and 9 so that the cut-off valves 101, 102, 103, and 104 open the branch lines 21, 22, 31, and 32, and controls the switching valves 106, 107, 108, and 109 so that they are displaced to the first valve position, thus halting the antiskid control.

The remaining construction of this embodiment is the same as that of the above described first embodiment, and therefore, the operation of the second embodiment is basically the same as shown in FIG. 2, except for the manner of halting the operation of the antiskid control.

A variation of the discharge pressure of the oil hydraulic pump 8 during an antiskid control is described below with reference to FIG. 4.

Figure 4:
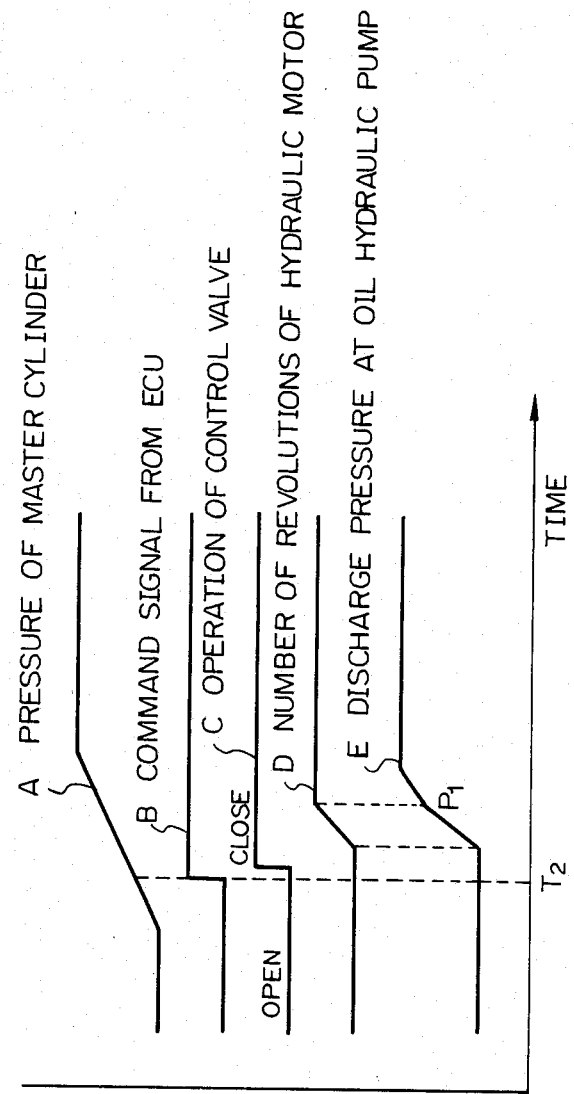
FIG. 4 is a diagram showing the operation of a hydraulic system of the second embodiment.

Pressure in the master cylinder 3 increases according to the force exerted on the brake pedal 1, as shown in FIG. 4 by the solid line A. While the pressure is increasing, if the ECU 100 senses a locking condition of a wheel, the ECU 100 outputs a command signal for an antiskid control at the time $T_2$, as shown by the solid line B. The control valve 111 is switched a little time after the command signal, as shown by the solid line C, whereby the oil hydraulic motor 10 starts to rotate as shown by the solid line D. With the rotation of the motor 10, the oil hydraulic pumps 8 and 9 are driven to increase the discharge pressure thereof as shown by the solid line E. In this embodiment, since the pressure sensor 121 is provided near the outlet port of the oil hydraulic pump 8, the discharge pressure of the pump 8, is determined by the sensor 121, as shown by the solid line E.

The state shown in FIG. 4 is that in which the oil hydraulic pumps 8 and 9 operate normally, since if the pumps 8 and 9 do not rotate normally for some reason, a normal antiskid control cannot be carried out and the antiskid control must be halted. Therefore, in this embodiment, the ECU 100 judges whether or not an antiskid control should be carried out, according to a program shown in FIG. 5.

Figure 5:
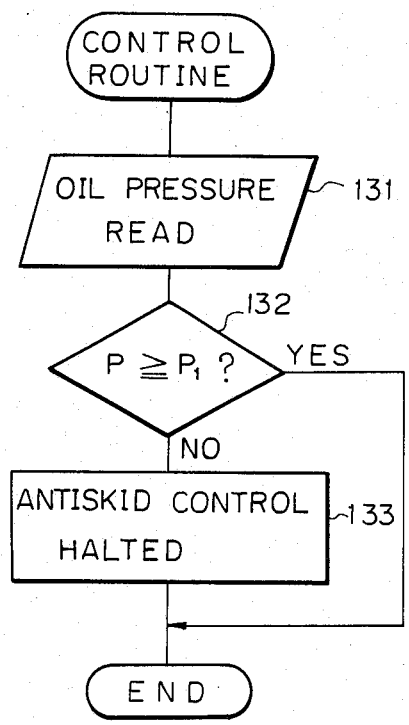
FIG. 5 is a general flow chart showing a control carried out by an ECU.

If the ECU 100 outputs the command signal for switching the one switching valve of the switching valves 106, 107, 108, and 109 corresponding to the wheel cylinder of the wheel in a locking condition, so that the pressure in that wheel cylinder is reduced, the control routine shown in FIG. 5 is started by the command signal. In this routine, an oil pressure P is read from an output of the pressure sensor 121 at step 131, and at step 132, it is judged whether or not this oil pressure P is higher than a predetermined value $P_1$. If the oil pressure P is higher than the predetermined value $P_1$, this routine ends, and antiskid control is continued. Conversely, if the oil pressure P is lower than the predetermined value $P_1$, step 133 is carried out and the antiskid control is halted. That is, the cut-off valves 101, 102, 103, and 104 are switched to the first valve position shown in FIG. 3, and the switching valves 106, 107, 108, and 109 are switched to the first valve position shown in FIG. 3, so that the wheel cylinders 4, 5, 6, and 7 are supplied with pressurized oil from the master cylinder 3.

According to the second embodiment, if the high-pressure oil system does not operate normally, antiskid control is halted.

Note that the cut-off valves 101, 102, 103, and 104 can be solenoid valves, as described in the first embodiment.

Figure 6:
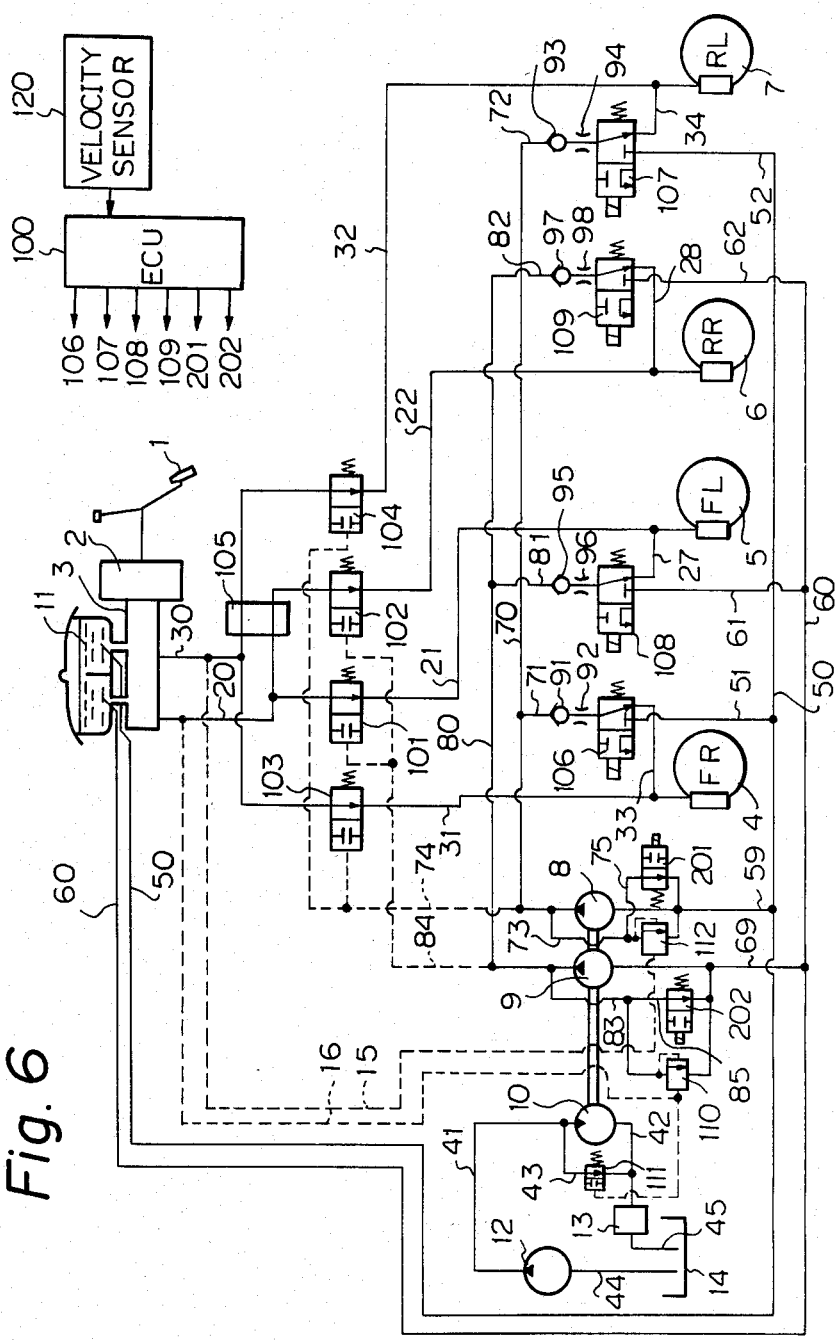
FIG. 6 is a hydraulic circuit of a third embodiment of the present invention.

FIG. 6 shows a third embodiment of the present invention. In this embodiment, the control valve 111 is not controlled by the ECU 100 but by a pressure from the master cylinder 3, through the lead line 16, to open and close the bypass line 43. That is, the control valve 111 opens the bypass line 43 when a brake operation is not carried out, as shown in the drawing, and closes the bypass line 43 when force is exerted on the brake pedal 1 for a braking operation, thereby increasing the pressure in the master cylinder 3. An upstream portion and a downstream portion of the relief line 73 are connected by a bypass line 75 in which a control valve 201 is provided. Similarly, an upstream portion and a downstream portion of the relief line 83 are connected by a bypass line 85 in which a control valve 202 is provided. The control valves 201 and 202 are at a first valve position shown in the drawing to open the bypass lines 75 and 85, respectively, when in a usual condition in which an antiskid control is not carried out. When an antiskid control is started, the control valves 201 and 202 are switched to a second valve position, not shown in the drawing, to close the bypass lines 75 and 85, respectively. These control valves 201 and 202 are electrically controlled solenoid valves, and are opened and closed by a command signal from the ECU 100.

The remaining construction of this embodiment is the same as that of the first embodiment, and therefore, the operation of the third embodiment is basically the same as the first embodiment, except for the operation of the control valves 201 and 202.

Operation of the third embodiment is described below with reference to FIG. 7.

In the non-operative condition in which a brake operation is not carried out, the cut-off valves 101, 102, 103, and 104 are positioned at the first valve position, respectively. Therefore, if force is exerted on the brake pedal 1, pressurized oil discharged from the master cylinder 3 is fed to the wheel cylinders 4, 5, 6, and 7 through the branch lines 31, 21, 22 and 32, respectively, so that the pressure in these wheel cylinders is quickly increased. In the drawing, if force is exerted on the brake pedal 1 at the time $T_0$, the pressure in the wheel cylinder quickly increases so that the velocity $V_w$ of the wheel immediately drops from the time $T_1$. The velocity $V_v$ of the vehicle body begins to drop from the time $T_1$, but the velocity $V_w$ drops more quickly than the velocity $V_v$.

In such a braking condition, when the pressure $P_m$ in the master cylinder reaches a predetermined pressure $P_0$ (time $T_6$), the control valve 111 is switched to the closed position, not shown in the drawing, by the pressure $P_m$, so that pressurized oil discharged from the oil supply pump 12 is supplied to the oil hydraulic motor 10. Thus, the oil hydraulic motor 10 is rotated by the supplied oil, and the pumps 8 and 9 are rotated by the oil hydraulic motor 10, at the time $T_7$.

Figure 7:
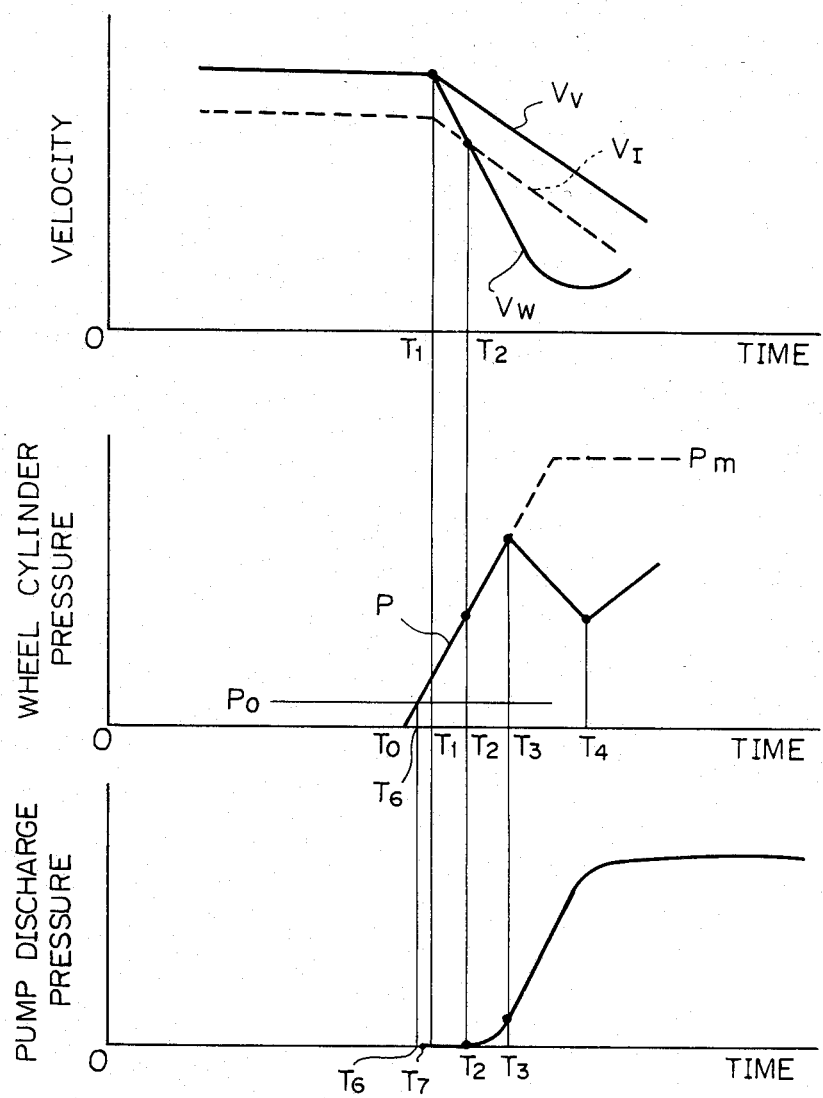
FIG. 7 is a diagram showing variation of a vehicle velocity, a wheel velocity, a wheel cylinder pressure, and a pump discharging pressure.

Then, if the velocity $V_w$ of the wheel becomes lower than a standard velocity $V_I$, which is lower than the velocity $V_v$ by a predetermined value as shown in FIG. 7, the ECU 100 judges that the slip ratio of the wheel is increasing, and outputs an antiskid control command signal. That is, at the time $T_2$, solenoids provided in the control valves 201 and 202 are energized so that the control valves 201 and 202 are switched to the second valve position, not shown in the drawing, to close the bypass lines 75 and 85, respectively. As a result, pressurized oil discharged from the oil hydraulic pumps 8 and 9 is fed to the cut-off valves 101, 102, 103, and 104 through the lead lines 74 and 84, so that the cut-off valves 101, 102, 103, and 104 are switched to the second valve position, not shown in the drawing, to close the branch lines 21, 22, 31, and 32 at the time $T_3$.

Operation after the time $T_3$ is similar to the operation of the first embodiment described with reference to FIG. 2. That is, the switching valves 106, 107, 108, and 109 are switched according to the deceleration or slip ratio of the wheels, so that the pressure in the wheel cylinders 4, 5, 6, and 7 is quickly reduced or slowly increased.

An antiskid control is halted by stopping the vehicle or turning off a brake switch provided on the brake pedal 1. At this time, the control valve 201 is switched to the first valve position shown in the drawing by the ECU 100, to relieve the pressurized oil discharged from the pump 8 to the reservoir 11 through the lines 73, 75, 59, and 50. Similarly, the control valve 202 is switched to the first valve position to relieve the pressurized oil discharged from the pump 9 to the reservoir 11. As a result, pressure in the lead lines 74 and 84 is reduced, so that the cut-off valves 101, 102, 103, and 104 are returned to the first valve position by the force of the corresponding springs, respectively, to open the branch lines 21, 22, 31, and 32. If the pressure in the master cylinder 3 is reduced below the predetermined pressure $P_0$ because the braking operation is finished, the control valve 111 is opened, pressurized oil discharged from the oil supply pump 12 flows only in the bypass line 43, and rotation of the oil hydraulic motor 10 is stopped. Accordingly, rotation of the pumps 8 and 9 coaxially rotated by the oil hydraulic motor 10 is also stopped.

In the antiskid control described above, by exerting force on the brake pedal 1, pressure in the master cylinder 3 reaches a predetermined value to switch the control valve 111 to the closed position at the time $T_6$, and the pumps 8 and 9 then start to rotate at the time $T_7$. After the control valves 201 and 202 are switched to the second valve position at the time $T_2$, the discharge pressure at the pumps 8 and 9 is increased to exert, at the time $T_3$, a discharge pressure sufficient to switch the cut-off valves 101, 102, 103, and 104 to the second valve position. Thus, the time $T_3$ when pressure in the wheel cylinder begins to decrease is advanced in comparison with the conventional system.

Figure 8:
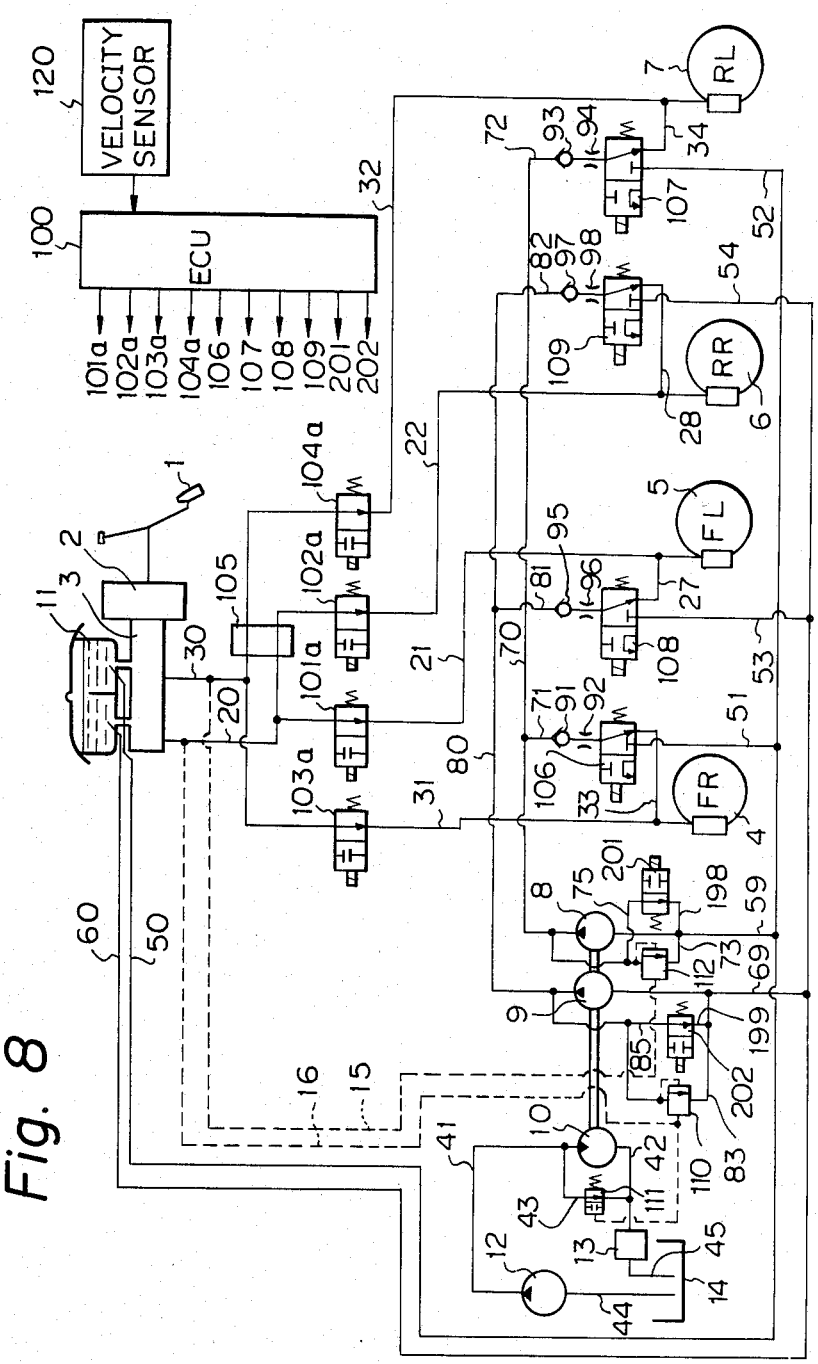
FIG. 8 is a hydraulic circuit of a fourth embodiment of the present invention.

FIG. 8 shows a fourth embodiment of the present invention. In this fourth embodiment, cut off valves 101a, 102a, 103a, and 104a provided in the branch lines 21, 22, 31, and 32, respectively, are solenoid valves which are electrically controlled by the ECU 100. The other constructions and operations are similar to the third embodiment.

Note that, though the above embodiments are applied to the brake system provided for a front-engine-front drive (FF) vehicle, the present invention also can be applied to a front-engine-rear-drive (FR) vehicle.

Further, the control valve 111 may be a valve controlled by a piezoelectric effect.

Figure 9:
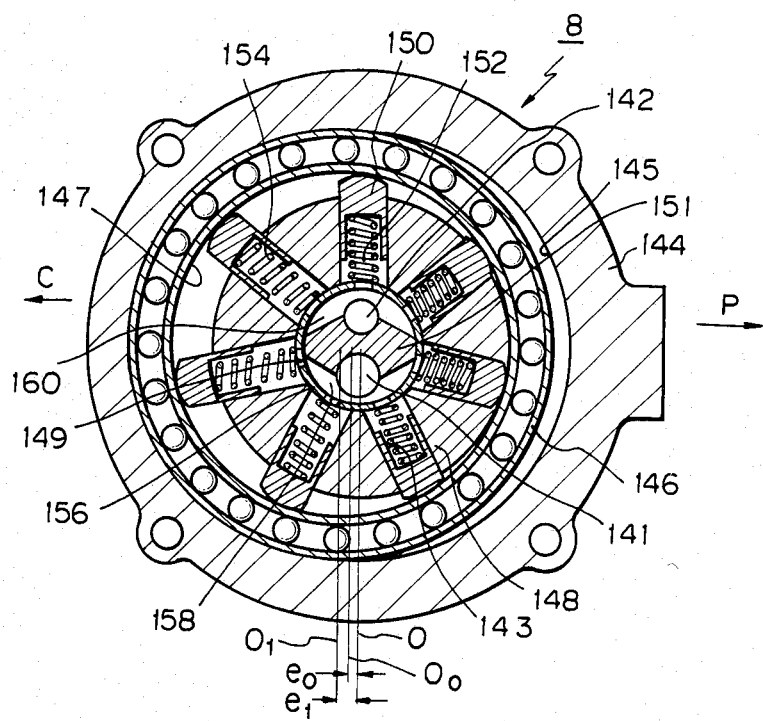
FIG. 9 is a sectional view of a hydraulic pump.

FIG. 9 shows the oil hydraulic pump 8, which is basically a radial plunger pump. This pump 8 is composed of a housing 144, a cam ring 146 movably mounted in the housing 144, and a rotor 148 rotatably housed in the cam ring 146. The housing 144 has an inlet port 141 communicating with the reservoir 11 and an outlet port 142 communicating with the cut-off valves and the wheel cylinders. The housing 144 is formed with an elliptical inner surface 145. The cam ring 146 is a radial ball bearing, the outer diameter thereof being equal to the length of the minor axis of the ellipse, so that the cam ring 146 cannot be displaced along the minor axis, but must move along the major axis of the ellipse (lateral direction in the drawing). In a prior art, the cam ring 146 was mechanically moved by a control piston (not shown) for variable capacity. Conversely, in this embodiment of the present invention, a variable capacity is obtained without such a mechanical construction. As described later, an operation of the radial plunger pump is obtained by providing an eccentricity between the center O of the rotor 148 and the center $O_1$ of the cam ring 146. The maximum capacity of the pump 8 is obtained when the cam ring 146 is positioned at the left side (as shown in the drawing) so that the eccentricity is a maximum value $e_1$, and the minimum capacity of the pump 8 is obtained when the cam ring 146 is positioned at the right side (not shown in the drawing) so that the eccentricity is a minimum value $e_0$.

The rotor 148 is formed with bores 143 extending in radial directions and positioned at constant intervals about the axis thereof. Plungers 150 are slidably supported in the bores 143 to define pressure chambered 152 therein. Springs 154 are provided in the bores 143, so that outer ends of the plungers 150 are in slidable contact with a cylindrical inner surface 147 of the cam ring 146. A cylindrical member 156 having holes 149, which communicate with the bores 152, is fitted in a center hole of the rotor 148. The cylindrical member 156 is rotatably supported by a rod 151 fixed to the housing 144 so that a suction chamber 158 and a discharge chamber 160 are defined in the cylindrical member 156. The suction chamber 158 and the discharge chamber 160 are partitioned by the rod, and the suction chamber 158 and the discharge chamber 160 communicate with the inlet port 141 and the outlet port 142, respectively. Therefore, when the rotor 148 rotates, the plungers 150 reciprocally move in the bore 143, so that the pressure chambers 152 expand and contract to communicate with the suction chamber 158 or the discharge chamber 160. The rotor 148 rotates in a clockwise direction in the drawing. When the pressure chamber 152 comes close to the suction chamber 158, the plunger 150 moves outward to expand the pressure chamber 152, so that oil is drawn into the pressure chamber 152 through the inlet port 141 and the suction chamber 158. When the pressure chamber 152 come closes to the discharge chamber 160, the plunger 150 moves inward to contract the pressure chamber 152, so that oil in the pressure chamber 152 is discharged to the discharge chamber 160 and the outlet port 142.

In FIG. 9, plungers 150 and springs 154 rotate with the rotor 148, so that the cam ring 146 is subjected to centrifugal forces through the plungers 150. The centrifugal force transmitted by the plunger 150 which projects most in the radial direction from the center O of the rotor 148 is the largest among the centrifugal forces. Therefore, the resultant force of the centrifugal force transmitted from the plunger 150 located at a constant angle acts along the arrow C shown in FIG. 9, and presses the cam ring 146 to the left side of the inner surface 145. That is, the resultant force of the centrifugal forces always presses the cam ring 146 in the direction in which the eccentricity of the cam ring 146 becomes largest.

Each plunger 150 is subjected to a force of the spring 154. The spring force is largest at the position where the spring 154 is most compressed. Therefore, the resultant force of the spring force acts in the direction shown by the arrow P, which is directly opposite to the direction of the arrow C, and presses the cam ring 146 in the direction in which the eccentricity of the cam ring 146 becomes smallest. Further, each plunger 150 displaces the oil in the pressure chamber 152 into the discharge chamber 160 during a discharge stroke, so that the plunger 150 is subjected to a force from the cam ring 146. Therefore, the cam ring 146 is subjected to a reaction force, which becomes large in proportion to the closeness of the end of a discharge stroke. Accordingly, the force acting on the cam ring 146 from the pressure chamber 152 is in the direction of the arrow P (upward and downward movement of the cam ring 146 in FIG. 9 is negligible).

Thus, the cam ring 146 is moved to the position where the eccentricity is $e_1$ or to the position where the eccentricity is $e_0$, according to the balance between the force in the direction of the arrow P and the force in the direction of the arrow C. If the number of revolutions of the oil hydraulic pump 8 is constant, the centrifugal force and the force of the springs 154 are constant, and only the pressures in the pressure chambers 152 change. That is, the position of the cam ring 146 is decided according to variation of the pressure in the pressure chamber 152.

In a brake system shown in FIG. 6, for example, when force is not exerted on the brake pedal 1, the pressure in the lines 70 and 74 communicating with the discharge chamber 160 of the pump 8 remains at the atmospheric pressure, because the pump 8 is not rotated and the outlet port 142 communicates with the reservoir 11 through the lines 73, 75, 59, and 50. Then, when force is exerted on the brake pedal 1, the pressurized oil discharged from the master cylinder 3 is supplied to the wheel cylinders 4, 5, 6, and 7, and the oil hydraulic motor 10 and the oil hydraulic pumps 8 and 9 are rotated. However, the discharge pressure of the oil hydraulic pump 8 is kept at the atmospheric pressure due to the opening of the switching valve 201 during the rotation of the pump 8.

When an antiskid control is to be carried out, the control valve 201 is switched to close the bypass line 75 so that a pressure in the lead line 74 rapidly increases to quickly switch the cut-off valves 103 and 104 and close the branch lines 31 and 32. To ensure a rapid increase of the pressure in the lead line 74, it is necessary for the pump 8 to supply a sufficient quantity of oil to the lead line 74 in the initial phase. In the embodiment shown in FIG. 8, the number of revolutions of the pump 8 has already reached a predetermined level at this initial phase. As described above, since the discharge pressure of the pump 8 is low, the force acting in the direction of the arrow P is less than the force acting in the direction of the arrow C, so that the cam ring 146 is located at the position where the eccentricity is at its largest value $e_1$. That is, the pump 8 is operating at a large capacity. Therefore, if the control valve 201 is switched to close the bypass line 75, a large quantity of oil is quickly supplied to the cut-off valves 103 and 104 so that the cut-off valves 103 and 104 quickly respond to shut the branch lines 31 and 32. Once the pressure in the lead line 74 becomes large, the force acting in the direction of the arrow P becomes larger than the force acting the direction of the arrow C, so that the cam ring 146 is displaced to the position where the eccentricity is at its minimum value $e_0$. Therefore, in this state, the capacity of the pump 8 is small.

Figure 10:
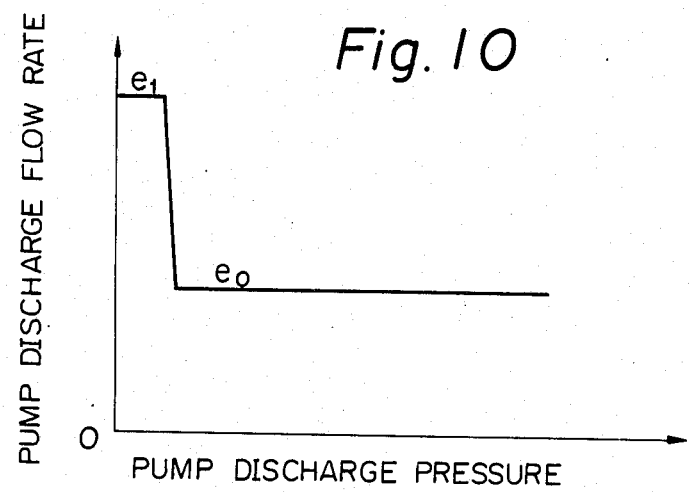
FIG. 10 is a diagram showing a relationship between a pump discharging pressure and a pump discharging capacity.

Thus, the capacity of the pump 8 is varied according to variation of the discharge pressure of the pump 8, as shown in FIG. 10. That is, when the discharge pressure is small, the capacity is large, and when the discharge pressure is large, the capacity is small.

Figure 11:
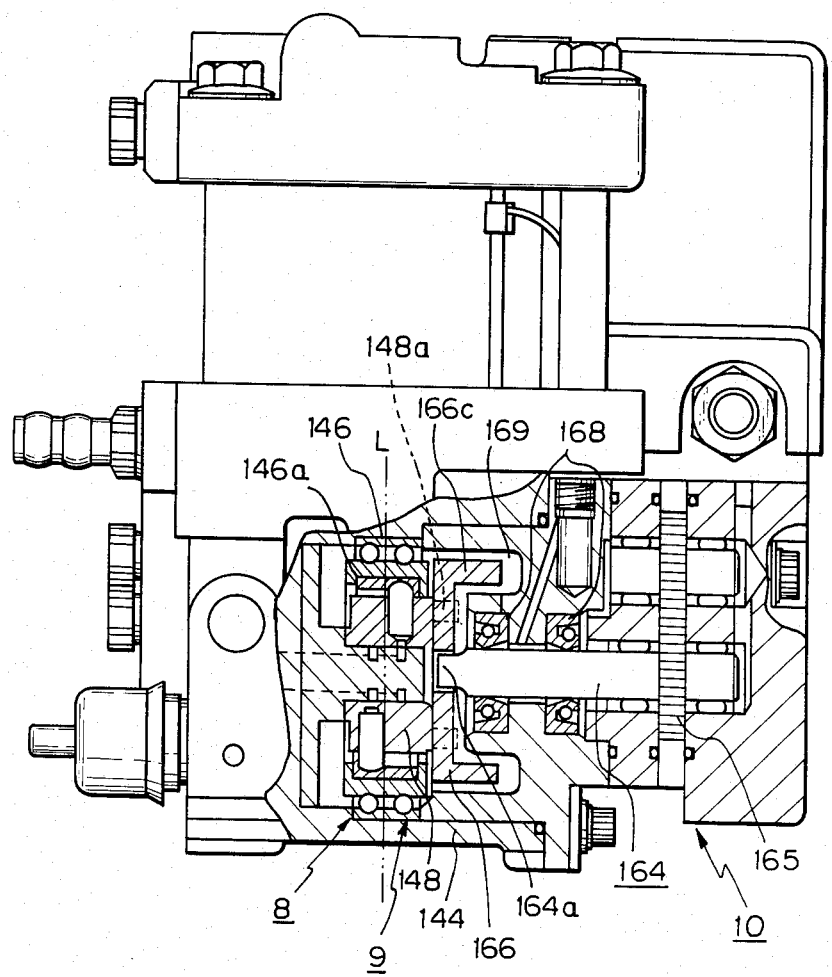
FIG. 11 is a partial sectional view of a hydraulic pump and a hydraulic motor which are constructed in one body.

FIG. 11 shows a construction in which the pumps 8 and 9 and the motor 10 are provided in the housing 144. The pump 8 has a construction shown in FIG. 10 except that a shoe 146$a$ is fitted in the cam ring 146. The pump 9 has the same construction as the pump 8. These pumps 8 and 9 are constructed in one body, and distinguished by a chain line L in the drawing. The pumps 8 and 9 are coaxially connected to and rotated by a shaft 164 of the oil hydraulic motor 10 through an Oldham's coupling 166.

Figure 12:
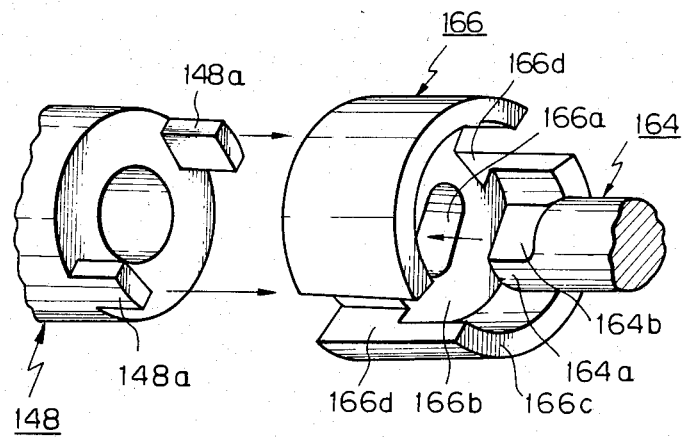
FIG. 12 is a perspective view of an Oldham's coupling, a shaft, and a rotor, in a disassembled state; and, FIG. 13 is a diagram showing a responsiveness of a brake oil pressure.

The right end of the shaft 164 is connected to a rotor 165 of the oil hydraulic motor 10 in one body with the shaft 164. The left end 164$a$ of the shaft 164 has two flat surfaces 164$b$ which are formed on side surfaces of the shaft 164 in such a manner that they are located at opposite sides, as shown in FIG. 12. The left end 164$a$ is inserted into a center hole 166$a$ formed in the Oldham's coupling 166, the center hole 166$a$ having larger section than the left end 164$a$ and having two flat surfaces similar to the flat surfaces 164$b$ of the shaft 164. The Oldham's coupling 166 has a disk portion 166$b$ formed with a center hole 166$a$ and two projecting portions 166$c$ extending in the axial direction of the disk portion 166b and having a semi-circular section. Notches 166d are formed between the two projecting portions 166c. The rotor 148 has two leg portions 148a facing each other and extending in the axial direction thereof. These leg portions 148a are fitted in the notches 166d. Thus, the shaft 164 and the rotor 148 are connected to each other by the Oldham's coupling 166, so that rotation of the oil hydraulic motor 10 is transmitted to the oil hydraulic pumps 8 and 9 through the shaft 164 and the Oldham's coupling 166.

The Oldham's coupling 166 has a generally cylindrical shape, the diameter of the peripheral portion thereof being larger than the diameter of the rotor 148, except for the notches 166d. Two seal members 168 are fitted on the shaft 164 so that the power steering oil flowing in the oil hydraulic motor 10 and brake oil flowing in the oil hydraulic pumps 8 and 9 are kept separate. An annular space 169 is formed around the portion near one of the seal members 168. The projecting portions 166c of the coupling 166 are loosely fitted into the annular space 169. An external form of the housing 144 is entirely similar to a previously known housing. That is, the Oldham's coupling 166 having the large diameter is provided in the housing 144 without changing the form of the housing 144.

Figure 13:
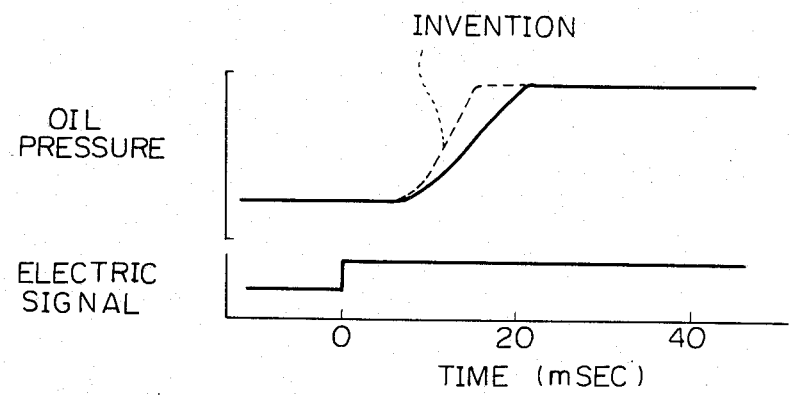

According to the above construction in which the Oldham's coupling 166 having a large diameter is provided, since the coupling 166 has a large inertia, the speed of rotation of the oil hydraulic pumps 8 and 9 is not lowered when the load of the pumps 8 and 9 is increased. That is, when the control valves 201 and 202 are switched to close the bypass lines 75 and 85, the speed of rotation of the oil hydraulic pumps 8 and 9 is not lowered by the load incurred by the oil hydraulic pumps 8 and 9 when switching the cut-off valves 101, 102, 103, and 104. Thus, the pressure in the lead lines 74 and 84 quickly increases, as shown in FIG. 13, and thus the responsiveness of the cut-off valves 101, 102, 103, and 104 is improved.

The construction shown in FIG. 11 is effective for an oil circuit having the lead lines 74 and 84 (FIGS. 1, 3, and 6) for controlling the cut-off valves 101, 102, 103, and 104, as shown in FIGS. 1, 3, and 6.

While embodiments of the present invention have been described herein with reference to the attached drawings, many modifications and changes may be made by those skilled in this art without departing from the scope of the invention.

We claim:

1. An antiskid control device controlling pressure in wheel cylinders of a brake system provided in a vehicle for preventing the vehicle from skidding through locking of the wheels thereof, said device comprising;
    a main line system having a first hydraulic source, a main line connecting said first hydraulic source to said wheel cylinders, and a cut-off valve provided in said main line to open and close said main line,
    a means for switching said cut-off valve to normally open said main line, and to close said main line when a locking condition occurs in the wheels of the vehicle,
    an oil hydraulic mechanism having an oil hydraulic source constantly generating a hydraulic pressure, an oil hydraulic motor rotating when said hydraulic pressure is transmitted from said oil hydraulic source, an oil hydraulic pump discharging a pressurized oil, a means for connecting said oil hydraulic motor to said oil hydraulic pump to drive said pump, and a means for transmitting the hydraulic pressure of said oil hydraulic source to said oil hydraulic motor when a locking condition occurs in the wheels,
    a subline system having a subline connecting said hydraulic pump to said wheel cylinders, a switching valve provided in said subline to open and close said subline, and a means for releasing a pressurized oil in the wheel cylinder to outside thereof when said switching valve. is closed,
    a means for controlling said switching valve to open or close said subline when a locking condition occurs in said wheels.

2. An antiskid control device according to claim 1, wherein said switching means is said oil hydraulic pump, which pump supplies a pressurized oil to said cut-off valve to close said main line when a locking condition occurs in said wheels.

3. An antiskid control valve according to claim 1, wherein said hydraulic source is an oil pump provided for a power steering system of a vehicle, said oil pump being constantly driven when an engine of a vehicle is driven.

4. An antiskid control device according to claim 1, wherein said hydraulic motor has an inlet port through which a pressurized oil flows into said hydraulic motor and an outlet port through which the pressurized oil flows to outside of said hydraulic motor, said transmitting means including a bypass line by which said inlet and outlet ports are bypassed and a control valve provided in said bypass line, said control valve, normally opening said bypass line, and closing said bypass line when a locking condition occurs in the wheels of a vehicle so that said oil hydraulic motor is rotated.

5. An antiskid control device according to claim 1, wherein said oil hydraulic pump has an inlet port through which a pressurized oil flows into said hydraulic pump and an outlet port through which the pressurized oil flows to outside of said oil hydraulic pump, said inlet and outlet ports being connected through a relief line having a relief valve, said relief valve opening said relief line in response to a pressure in said main line so that a pressure of oil discharged from said oil hydraulic pump is kept lower than the pressure in said main line.

6. An antiskid control device according to claim 1, further comprising a pressure sensor sensing a pressure in an outlet port of said oil hydraulic pump, said switching means switching said cut-off valve to open said main line when the pressure in said outlet port is below a predetermined value.

7. An antiskid control device according to claim 1, wherein said oil hydraulic pump has an inlet port through which a pressurized oil flows into said hydraulic pump and an outlet port through which the pressurized oil flows to outside of said oil hydraulic pump, said inlet and outlet ports being bypassed by a bypass line having a control valve, said control valve normally opening said bypass line, and closing said bypass line when a locking condition occurs in the wheels of a vehicle.

8. An antiskid control device according to claim 2, wherein said oil hydraulic pump comprises;
    a housing having an inlet port communicating with a reservoir for oil and an outlet port communicating with said cut-off valve and said wheel cylinders,
    a cam ring movably housed in said housing, said cam ring having a cylindrical inner surface, a rotor rotatably housed in said cam ring in such a manner that the center of said rotor is eccentric from the center of said cam ring, said rotor being formed with bores extending in radial directions, said rotor having plungers slidably supported in said bores to define pressure chambers in said bores, the end portions of said plungers being in slidable contact with said inner surface so that said pressure chambers expand and contract during rotation of said rotor, oil being drawn into said pressure chambers when said pressure chambers expand and communicate with said inlet port, and oil in said pressure chambers being discharged through said outlet port when said pressure chambers contract and communicate with said outlet port, said cam ring displacing in said housing in such a manner that, when a pressure in said pressure chamber is relatively low, said cam ring is located at a position to one side so that the discharge capacity of said oil hydraulic pump becomes relatively large, and when a pressure in said pressure chamber is relatively high, said cam ring is located at a position on the other side so that the discharge capacity of said oil hydraulic pump becomes relatively small.

9. An antiskid control device according to claim 8, wherein said connecting means is an Oldham's coupling having a diameter larger than that of said rotor.

* * * * *